(12) United States Patent
Paxton et al.

(10) Patent No.: US 6,836,751 B2
(45) Date of Patent: Dec. 28, 2004

(54) OPTICAL CONTROLLER

(75) Inventors: William B. Paxton, Chicago, IL (US); Donald A. Rosenwinkel, Oak Park, IL (US)

(73) Assignee: Radica China Ltd. (VG)

( * ) Notice: Subject to any disclaimer, the term of this patent is extended or adjusted under 35 U.S.C. 154(b) by 146 days.

(21) Appl. No.: 10/055,636

(22) Filed: Jan. 23, 2002

(65) Prior Publication Data

US 2003/0149549 A1 Aug. 7, 2003

(51) Int. Cl.[7] .................. G06F 15/00; G06F 3/02; G06F 1/04; G02B 26/08
(52) U.S. Cl. .................. 702/186; 359/201; 380/52; 708/191
(58) Field of Search .................. 702/84, 150, 182, 702/186; 340/5.27, 5.54; 380/52; 713/202; 359/201; 396/310; 708/191

(56) References Cited

U.S. PATENT DOCUMENTS

| | | | |
|---|---|---|---|
| 3,587,051 A | 6/1971 | Hovey | 340/5.27 |
| 3,893,073 A | 7/1975 | Angello | 340/5.57 |
| 4,479,112 A | 10/1984 | Hirsch | 380/52 |
| 4,953,111 A | 8/1990 | Yamamoto et al. | 364/569 |
| 5,202,845 A * | 4/1993 | Andonovic et al. | 708/191 |
| 5,325,133 A | 6/1994 | Adachi | 351/209 |
| 5,367,315 A | 11/1994 | Pan | 345/156 |
| 5,402,109 A | 3/1995 | Mannik | 340/575 |
| 5,410,376 A | 4/1995 | Cornsweet et al. | 351/210 |
| 5,583,795 A | 12/1996 | Smyth | 364/516 |
| 5,625,380 A | 4/1997 | Hansen | 345/157 |
| 5,790,099 A | 8/1998 | Okada | 345/157 |
| 5,844,544 A | 12/1998 | Kahn et al. | 345/156 |
| 5,859,686 A | 1/1999 | Aboutalib et al. | 351/209 |
| 5,912,721 A | 6/1999 | Yamaguchi et al. | 351/210 |
| 5,928,364 A | 7/1999 | Yamamoto | 713/202 |
| 5,956,122 A | 9/1999 | Doster | 351/210 |
| 6,219,439 B1 | 4/2001 | Burger | 382/115 |
| 6,229,964 B1 * | 5/2001 | Bell | 396/310 |
| 6,456,414 B1 * | 9/2002 | Dahlke et al. | 359/201 |

FOREIGN PATENT DOCUMENTS

| | | |
|---|---|---|
| EP | 0863491 A1 | 3/1997 |
| GB | 2075671 A | 5/1981 |
| GB | 2281838 A | 1/1994 |

OTHER PUBLICATIONS

Beaumont, "Calibration for optical filter", Pub. No: US 2001/0038452 A1, PubDate: Nov. 8, 2001.*

* cited by examiner

Primary Examiner—John Barlow
Assistant Examiner—John Le
(74) Attorney, Agent, or Firm—Bingham McCutchen LLP

(57) ABSTRACT

An apparatus and method for controlling access to, or interaction with, a variety of different types of devices is provided. The system includes a plurality of different lights that flash sequentially, the lights being distinguishable on the basis of color, location within a light pattern, or labeling. Alternately the system includes a single light that sequentially flashes different colors. The user enters data into the system by responding to particular lights in accordance with a predetermined light sequence. Alternately, the user enters data by responding to a particular light where each light corresponds to a predefined response. In general, a user responds to a particular light by triggering a response with the system's controller while the particular light is lit or before the next light in the sequence becomes lit. A user can trigger a response in a variety of ways, ranging from blinking an eye to pressing or otherwise operating a mechanical switch.

35 Claims, 6 Drawing Sheets

OPTICAL CONTROLLER

FIELD OF THE INVENTION

The present invention relates generally to controllers and, more particularly, to an optical controller that can be used to control access to, or interaction with, a variety of different types of devices.

BACKGROUND OF THE INVENTION

Pupil monitoring systems have been developed for a variety of different applications. In particular, pupil monitoring systems have been used to track eye movement and eyelid closure.

A number of patents disclose the use of eye monitors to sense the onset of sleep, thus allowing an alarm signal to be sent to the monitored party, a particularly useful device for automobile drivers. For example, U.S. Pat. No. 4,953,111 discloses such a doze detector, wherein the doze detector includes at least two sensors, each sensor consisting of a light source, a detector and a logic circuit. One of the sensors is aimed at a left portion of the user's eye while a second of the sensors is aimed at a right portion of the user's eye. When the user looks directly in front, each of the sensors receives a small portion of the light reflected from the user's iris. By adding the output from the two sensors, the system is able to compensate for variations in reflected light due to the position of the iris, thus providing accurate doze detection.

Another doze detector is disclosed in U.S. Pat. No. 5,402,109. The disclosed device, designed for use in either daytime or nighttime driving, reflects a narrow band of light off of the user's eye. By monitoring the reflected light, the device determines whether the user's eyes are open or closed. The device, designed to be incorporated into a pair of eyeglasses, includes a circuit for determining the length of time the user's eyes are closed and means for emitting an alarm.

A variety of systems have been designed that provide eye tracking. For example, U.S. Pat. No. 5,325,133 discloses a device for determining the position or direction that a user is looking. The device includes at least one infrared light source, and preferably at least three infrared light sources, as well as image pick-up units that correspond to each light source. In the disclosed system, the image pick-up units receive face images based on the rays reflected by the face. Pupil areas are read from the face images. The user's direction of gaze is determined from the light reflected from the user's pupils.

U.S. Pat. No. 5,410,376 discloses an electro-optical tracking system that includes a quadrant detector for determining the relative direction of eye movement. The output from the quadrant detector is processed by a microprocessor under the control of three different software systems. The three software systems provide pupil recognition, blink detection, and servo tracking. The software systems work together to insure accurate tracking of rapid eye movements.

U.S. Pat. No. 5,367,315 discloses a system that can be used to control cursor movement on a computer monitor. The disclosed system transmits infrared light into a defined area where the user's head is located during computer operation. Multiple sensors positioned near the computer monitor detect infrared light reflected from the user's eyes and face. By monitoring the amplitude of the reflected infrared light, changes in eye position are determined.

SUMMARY OF THE INVENTION

An apparatus and method for controlling access to, or interaction with, a variety of different types of devices is provided. The system includes one or more lights and provides a means for a user to enter data into the system by responding to particular lights. In general, a user responds to a particular light by triggering a response with the system's controller while the particular light is lit or before the next light in the sequence becomes lit.

In at least one embodiment of the invention, the system uses a plurality of different colored lights that flash sequentially or a single light that sequentially flashes different colors. The system can be configured to either randomly or non-randomly sequence the different colors. The user enters data into the system by responding to particular colored lights.

In at least one embodiment of the invention, the system uses a plurality of sequentially flashing lights that are arranged in a predetermined pattern. The lights may or may not include labels. The system can be configured to either randomly or non-randomly sequence the pattern of lights. The user enters data into the system by responding to particular lights within the pattern.

In at least one embodiment, the invention is used as a means of controlling access to a lockable enclosure or to an electronic data base or to an electronic device. The user enters an access code by responding to the colored lights in accordance with a predetermined color sequence.

In at least one other embodiment, the invention is used as an interface with a personal computer, dedicated gaming device, dedicated educational device, or other device. The user enters data by responding to a particular light in response to a posed question or at an appropriate juncture in a game. In this embodiment, each light is assigned a predefined response. For example, assuming that different colored lights are used, the color green can be equated to "yes", red equated to "no" and yellow equated to "sometimes". In an alternate example, green equates to choice a, red equates to choice b, yellow equates to choice c, etc.

In at least one embodiment of the invention, the user triggers a response by blinking an eye. In at least one other embodiment, the user triggers a response by pressing or otherwise operating a mechanical switch. The mechanical switch can be mounted within the eyepiece, or on the body of a system housing, or in a different location.

A further understanding of the nature and advantages of the present invention may be realized by reference to the remaining portions of the specification and the drawings.

DESCRIPTION OF THE SPECIFIC EMBODIMENTS

The system of the present invention provides a means of controlling access to, or interaction with, a variety of different types of devices. The system includes a plurality of sequentially flashing lights. The user enters data into the system by responding to particular lights in accordance with a predetermined sequence. Alternately, the user enters data by responding to a particular light of the plurality of lights where each light corresponds to a predefined response (e.g., green or left light equates to yes, red or right light equates to no, yellow or center light equates to unsure, etc.). In general, a user responds to a particular light by entering a response while the particular light is lit or before the next light in the sequence becomes lit. As described in further detail below, the invention can be configured to allow a user to respond in a variety of ways, ranging from blinking an eye to pressing or otherwise operating a mechanical switch.

Figure 1:
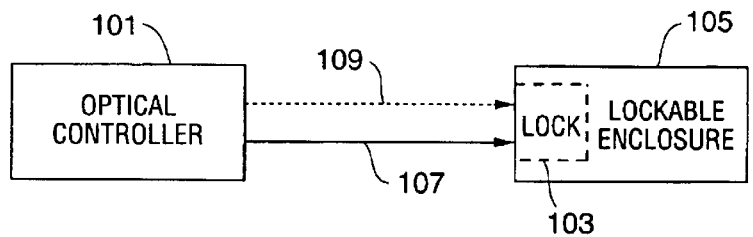
FIG. 1 is an illustration of the optical controller of the invention used in conjunction with an electronic lock.
Figure 2:
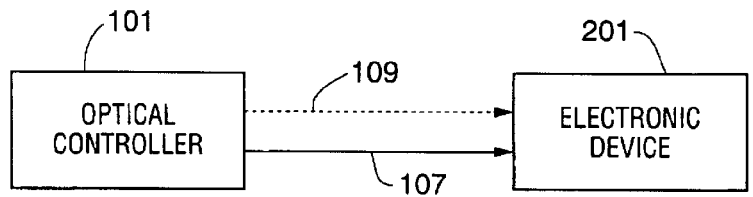
FIG. 2 is an illustration of the optical controller of the invention used in conjunction with an electronic device such as a personal computer.

FIGS. 1 and 2 illustrate some applications of the present invention, although it will be appreciated that other applications are also available. As illustrated in FIG. 1, an optical controller 101 in accordance with the present invention is coupled to an electronic lock 103 associated with a lockable enclosure or container 105. Electronic locks using electromagnetic mechanisms or other means are well known and are therefore not described in detail in the present specification. Preferably optical controller 101 is coupled to electronic lock 103 via a wired connection 107. Alternately, optical controller 101 can be coupled to electronic lock 103 via a wireless connection 109. An example of a lockable enclosure that can utilize the present invention is a journal or diary that is locked by means of an electronic lock rather than a simple key or combination lock.

As illustrated in FIG. 2, optical controller 101 can also be used as a user interface. In this example optical controller 101 is coupled to an electronic device 201. Device 201 can be a personal computer, a dedicated gaming system, or other device. Controller 101 can be used to input a user access code to device 201, thus preventing unauthorized access, for example to a computer or computer data base. Alternately, controller 101 can be used to input data to device 201, for example by allowing the user to respond to multiple choice questions generated by device 201. In this example, gaming or educational software is run on a personal computer, the software periodically asking questions of the user via either a voice synthesis module or an associated display. By utilizing controller 101, the user can respond by a means in addition to a keyboard, mouse, game controller or other interface. Alternately, controller 101 can provide a substitute data input means, for example for use by a physically impaired user.

Figure 3:
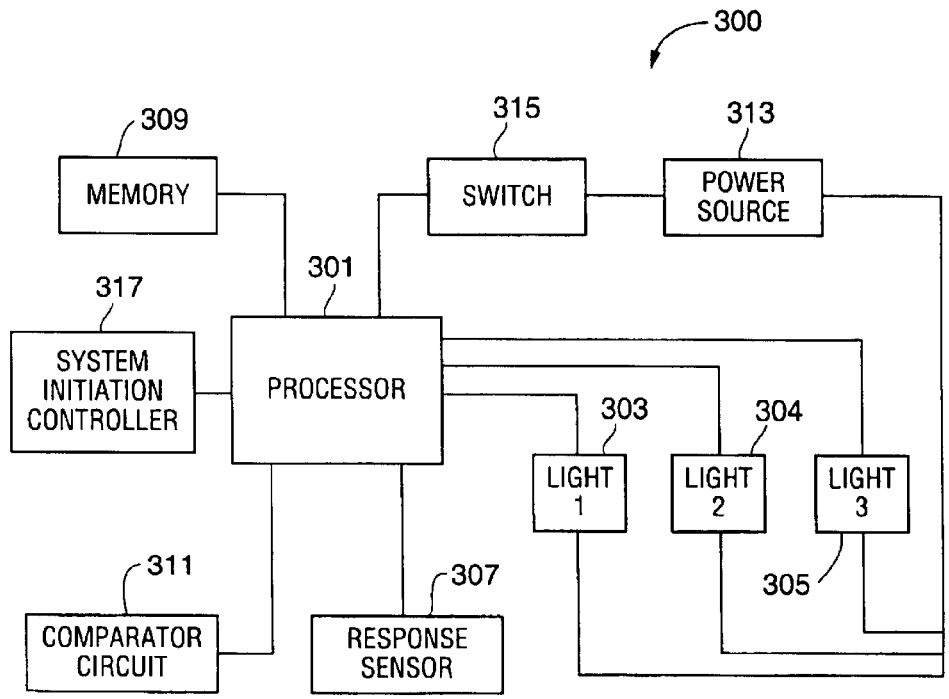
FIG. 3 is a simplified block diagram of the optical controller of the invention.

FIG. 3 is a simplified block diagram of an optical controller 300 in accordance with the invention. A processor 301 is used to control the functionality of controller 300. Coupled to processor 301 is a plurality of lights 303–305. Although both fewer and greater numbers of lights can be used, preferably the controller uses three lights as shown.

Lights 303–305 are preferably light emitting diodes (LEDs). In at least one preferred embodiment, lights 303–305 emit different colors (e.g., red, green, yellow). The different colors can be achieved by using sources that emit at different wavelengths, or by placing filters between the individual light sources and the viewer, or by a combination thereof. The filters can, for example, be integrated into the housings of the individual lights. Alternately, a single light can be used that is capable of emitting different colors. In at least one other preferred embodiment, lights 303–305 emit the same color of light and are arranged in a predetermined pattern thus allowing the user to respond on the basis of light location rather than light color. In at least one other preferred embodiment, labels corresponding to each light of lights 303–305 are used to distinguish the different lights.

A response sensor 307 is coupled to processor 301, response sensor 307 sensing user input. As described in further detail below, response sensor 307 can utilize touch sensitive switches, optical sensors, or other means.

A memory 309, preferably comprised of both volatile and non-volatile memory, is coupled to processor 301 and used to maintain controller operating instructions and access codes (e.g., predefined response sequences). Memory 309 is also used to register, at least temporarily, the output from response sensor 307.

A comparator circuit 311, either imbedded within processor 301 or coupled thereto, compares the output of response sensor 307 (i.e., the sensor's state of operation) with a predefined response in order to determine, and output, an appropriate response as described more fully below.

A power source 313 is coupled to processor 301 as well as other system components (e.g., lights 303–305) as necessary. In general power source 313 is a battery, thus making controller 300 portable, although other power sources can be used with the invention. Preferably power source 313 is coupled to controller 300 via a switch 315, thus allowing power drainage during non-use to be minimized. Switch 315 can be a vibration-sensing switch, thus activating the device when it is picked-up or otherwise moved. Alternately, switch 315 can be a simple on-off switch mounted on the housing of controller 300 that the user activates. Alternately, switch 315 can be a pressure-sensitive, capacitive, or other switching means that is integrated into the controller housing (e.g., within a user grip, a housing eyepiece, etc.).

Figure 4:
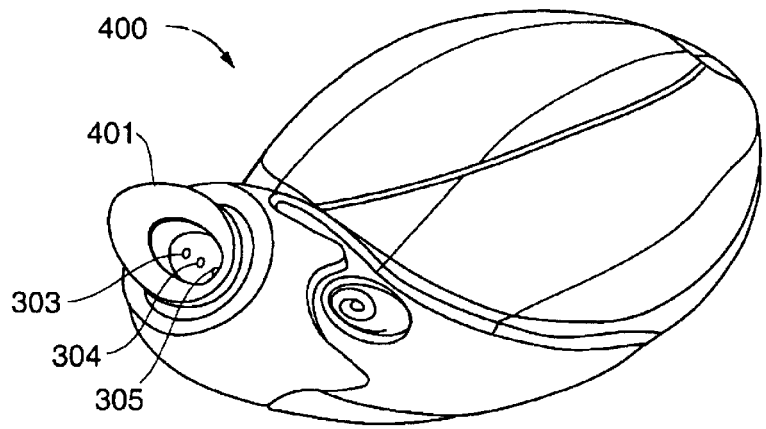
FIG. 4 illustrates an embodiment of the invention in which the controller is housed within a hand-held device.

In at least one embodiment of the invention, controller 300 is housed within a hand-held device 400 as illustrated in FIG. 4. It will be appreciated that device 400 is only exemplary and that other configurations can be used. For example, controller 300 can be housed in a desk-top housing, coupled permanently or semi-permanently to the enclosure or device for which it is to be used. Alternately, controller 300 can be configured to utilize two eyepieces in which either one or both eye-pieces include lights and/or response sensors, etc.

Hand-held device 400 includes at least one eyepiece 401. Eyepiece 401 serves several purposes. First, it insures that only the intended user can view lights 303–305. Although there are embodiments of the invention which do not utilize an eyepiece and thus allow others to view lights 303–305, in at least one of the preferred embodiments it is imperative that only the intended user view the lights in order to insure that the access code remains secure. Second, eyepiece 401 can be used to initialize the controller, starting the sequencing of lights 303–305. This aspect of the invention can be realized, for example, using a pressure sensitive switch located within eyepiece 401 or a capacitance switch located on the outer surface of the eyepiece. Third, eyepiece 401 can includes a means of sensing user responses, for example through the use of a pressure sensitive switch located within the eyepiece. Fourth, eyepiece 401 allows some implementations of response sensor 307 to be used which are sensitive to ambient light and thus must be shielded during use.

Figure 5:
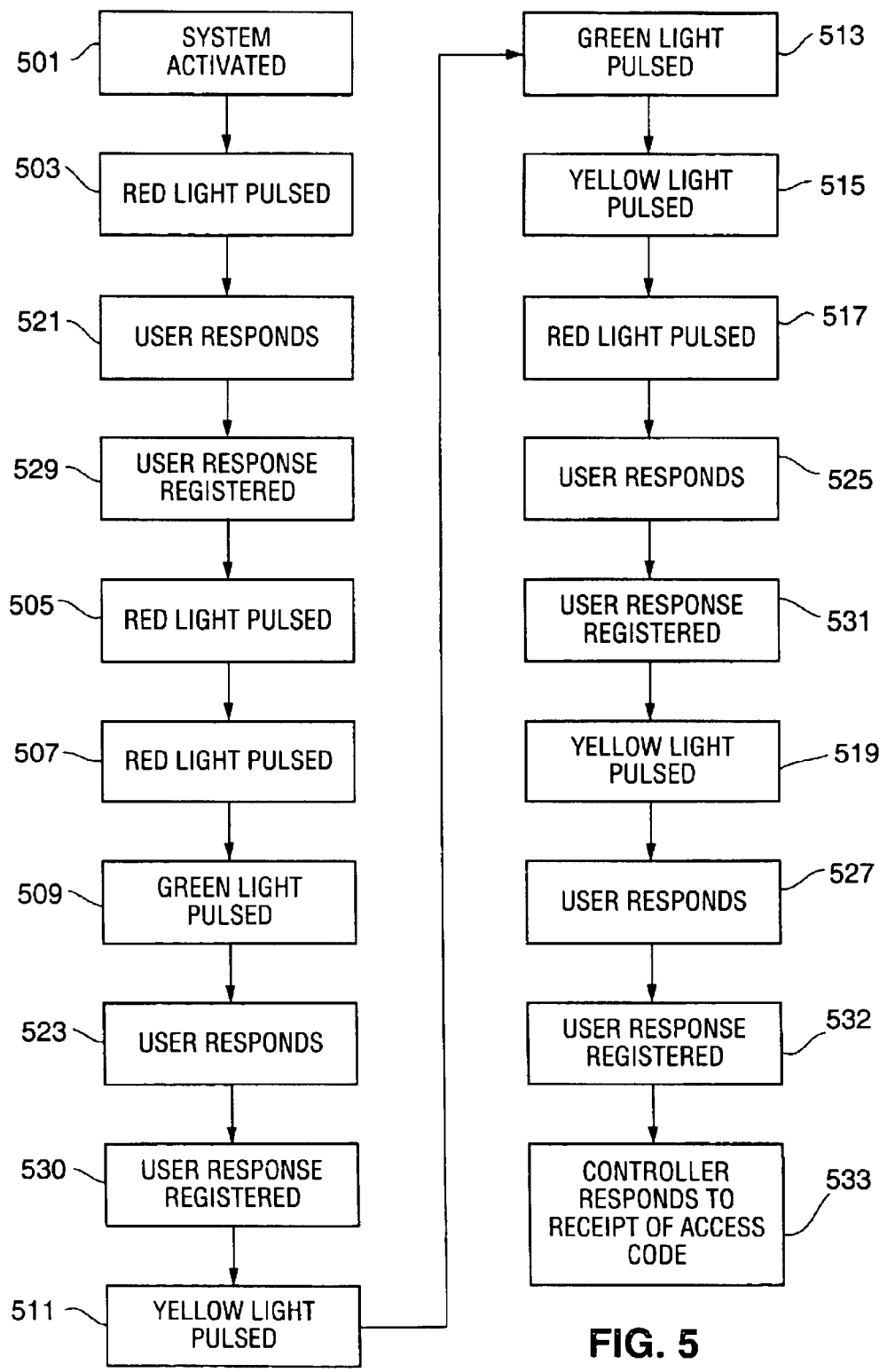
FIG. 5 illustrates the methodology associated with at least one embodiment of the invention in which the light sequence is random.
Figure 6:
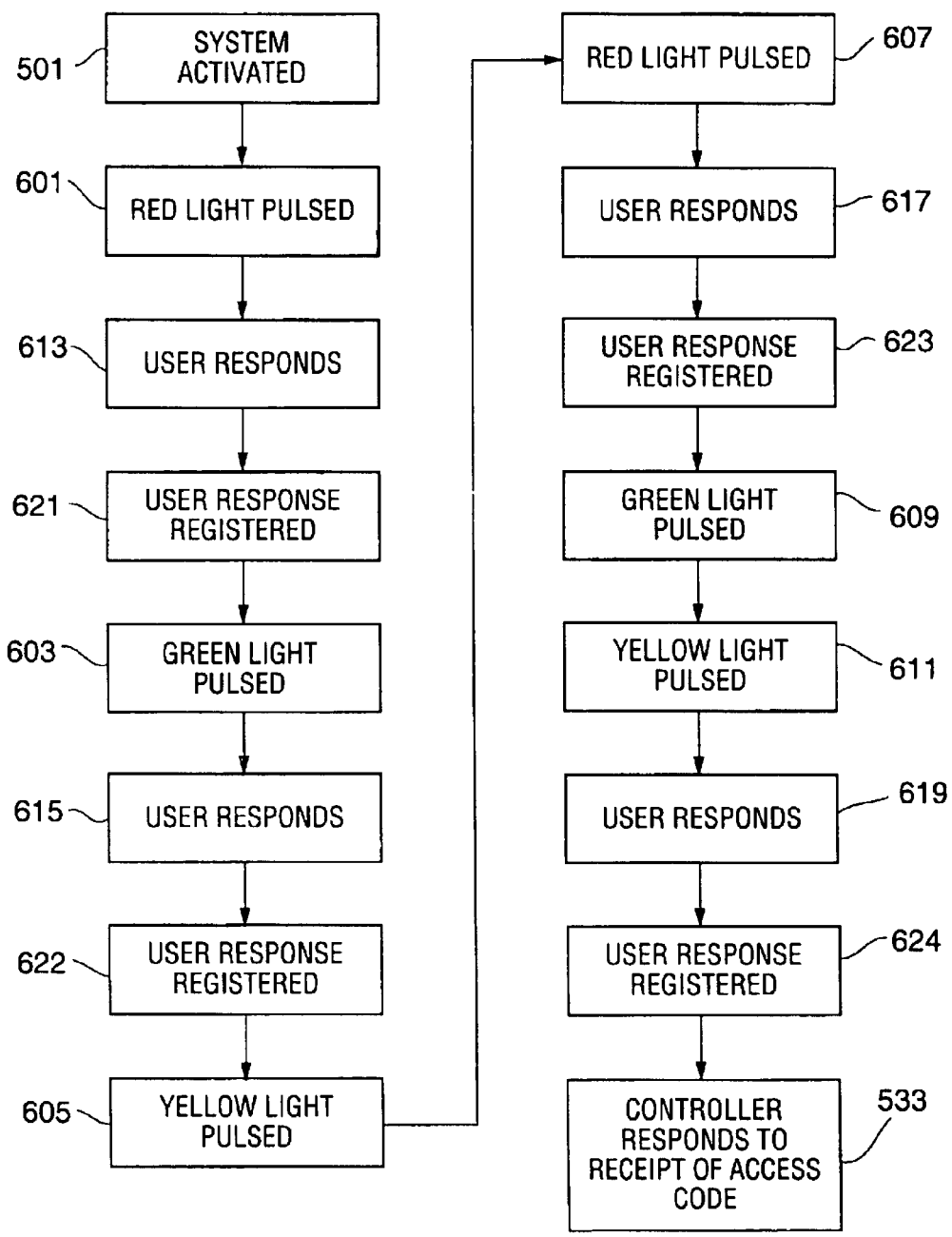
FIG. 6 illustrates the methodology associated with at least one embodiment of the invention in which the light sequence is non-random.

FIGS. 5 and 6 illustrate two methods of using controller 300. In each of these examples it is assumed that controller 300 is coupled to three lights, a red light, a green light, and a yellow light. For purposes of these examples it is also assumed that the user's access code is defined as red, green, red, yellow. As illustrated in FIG. 5, after the system is activated (step 501), the lights coupled to the controller are sequentially pulsed. In this embodiment the light sequence is random and it is assumed that the initial portion of the random light sequence is red (step 503), red (step 505), red (step 507), green (step 509), yellow (step 511), green (step 513), yellow (step 515), red (step 517) and yellow (step 519). In order to input the access code, the user responds to those lights of the random sequence that correspond to the pre-defined access code (i.e., the pre-defined light sequence), the user's response following the pre-defined sequence. Thus in this example, the user would respond after activation of the first light pulse (step 521-red), the fourth light pulse (step 523-green), the eighth light pulse (step 525-red), and the ninth light pulse (step 527-yellow). After each user response, controller 300 notes the response (steps 529–532, respectively) in order to determine whether or not the user has input the proper access code. If the user inputs the proper access code, controller 300 responds in accordance with a pre-programmed response (step 533). For example, controller 300 can send a signal to an electronic lock 103 causing it to unlock. Alternately, controller 300 can send a positive response to electronic device 201.

In the method illustrated in FIG. 6 it is assumed that the lights flash in a non-random sequence, specifically red (step 601), green (step 603), yellow (step 605), red (step 607), green (step 609), yellow (step 611), etc. Assuming that the same access code is used as in the example of FIG. 5, the user would respond after the first light pulse (step 613-red), the second light pulse (step 615-green), the fourth light pulse (step 617-red), and the sixth light pulse (step 619-yellow). As in the previous example, after each user response the controller notes the response (steps 621–624, respectively) and if the predefined access sequence is input, controller 300 responds in accordance with a preprogrammed response (step 533).

Figure 7:
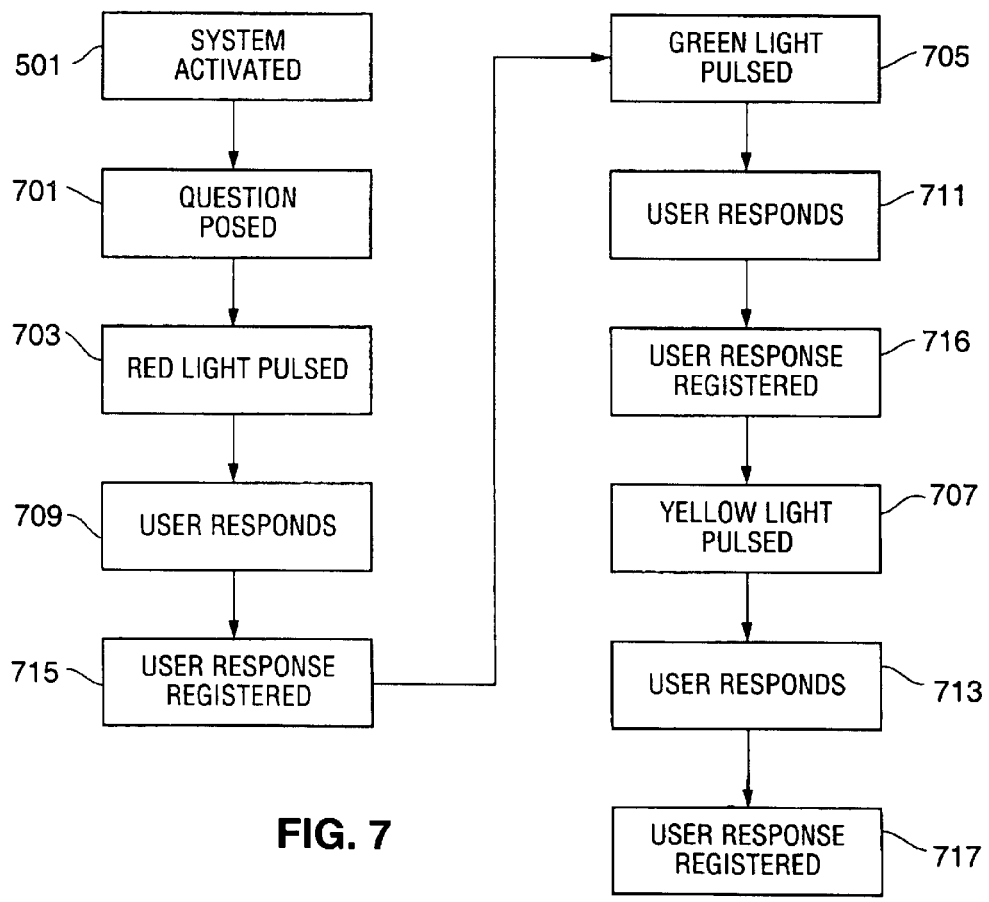
FIG. 7 illustrates the methodology associated with at least one embodiment of the invention in which the controller is used as a data input device.

In the method illustrated in FIG. 7, controller 300 is used as an interface device, for example for use by a physically impaired person. In this system each color corresponds to a pre-defined response. For example, red can correspond to "no", green can correspond to "yes", and yellow can correspond to "repeat the question" or "unsure". Alternately, in a multiple-choice scenario, red can correspond to selection 1, green can correspond to selection 2, and yellow can correspond to selection 3. Preferably in this method, as in that illustrated in FIG. 6, an ordered, non-random sequence of lights is used.

As illustrated, once the system is activated (step 501), a question is posed to the user (step 701). The question can be posed using a graphical display, a speech synthesis system, or other means. Alternately, the question can be posed by a human questioner, controller 300 being used in this embodiment as a means of recording or otherwise noting the user's responses. After a question is posed, controller 300 flashes the lights in a predetermined sequence such as red (step 703), green (step 705) and yellow (step 707). Depending upon the intended answer of the user, he or she either responds after the red light is flashed (step 709), after the green light is flashed (step 711) or after the yellow light is flashed (step 713). The controller notes the user's response, or lack thereof (steps 715–717). The process of asking questions and noting/recording responses continues as long as desired.

It should be understood that although the methodology described with reference to the examples in FIGS. 5–7 utilize red, green, and yellow lights, other colors can be used without departing from the invention. Similarly, rather than relying on the color of a specific light, the location or a label associated with a specific light can be used as the basis of the user's response. Thus, for example, the three lights referenced in FIGS. 5–7 can all emit the same color (e.g., white light) and be distinguishable by the user on the basis of their location (e.g., left, center and right locations for three lights in a row) or their label (e.g., A, B and C). Accordingly in the examples given in FIGS. 5 and 6, assuming that the red light equates to the left most light or to the light labeled A, the green light equates to the center light or the light labeled B, and the yellow light equates to the right most light or the light labeled C, the user's access code would be left light, center light, left light, right light if the lights are distinguishable on the basis of location, and A, B, A, C if the lights are distinguishable on the basis of label. Alternately, assuming that the system is used as an interface device as described with reference to FIG. 7, and assuming the same transformation from colored lights to light locations or labels as noted above, the left most light or the light labeled A would correspond to "no", the center light or the light labeled B would correspond to "yes" and the right most light or the light labeled C would correspond to "repeat the question" or "unsure". Thus, for the systems described with reference to FIGS. 5 and 6 and as modified above, the user would enter their access code by responding to those lights of the random sequence that correspond to the pre-defined access code (e.g., left light, center light, left light, right light or A, B, A, C). For the system described with reference to FIG. 7 and as modified above, the user would respond when the light at the location corresponding to their desired response, or the labeled light corresponding to their desired response, flashes.

Depending upon the embodiment, controller 300 can be configured to respond to an improper input in a variety of ways. For example, if controller 300 is used as an access code input device, as illustrated in FIGS. 5 and 6, and an incorrect code is input, controller 300 can allow the user to retry inputting the access code. The controller can be configured to allow the user either unlimited retries or a preset number of user attempts. In the latter configuration the system preferably initiates a time-out sequence lasting for a predetermined time period if the controller registers more than the predefined number of failed access attempts within the pre-defined time period. The controller can also be configured to time-out after each failed attempt of entering the access code. Alternately or in combination with the time-out sequences, the controller can be configured to notify the user of an unaccepted access code, for example by emitting a beep or other audible sound or simultaneously flashing all of the lights. If controller 300 is used as a data input device such as that described with reference to FIG. 7, then the system preferably reposes the last question if no response is received. Alternately, the controller may emit an audible sound or otherwise notify the user that no data input has been received, thus prompting the user to answer the question (or in the case of unregistered input, re-enter the answer).

In the preferred embodiment of the invention, each light is pulsed for a period of 2 seconds with a period between light pulses of 2 seconds, thus providing the user with sufficient time to recognize and respond to a light. The controller can also be configured to allow either longer or shorter light pulses and either longer or shorter periods between light pulses. Additionally, it is not a requirement of the invention that the period that the lights are pulsed be equivalent to the period between light pulses.

It will be appreciated that controller 300 can be configured to allow the end user to designate many aspects of system operation. For example, controller 300 can be configured to allow the user to determine the light pulse time, the delay between light pulses, the sequence of light pulses (e.g., random versus ordered; sequence if ordered), the access code, the complexity of the access code (e.g., 3 light sequence versus 5 light sequence, etc.), and the consequences of a failed access code input.

Figure 8:
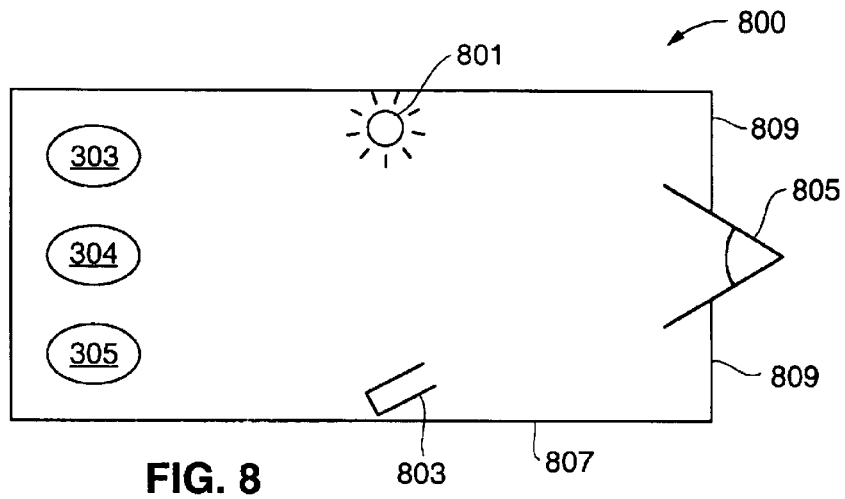
FIG. 8 illustrates an embodiment of a response sensor.

As previously noted, the controller of the invention can be used with a variety of response sensors. For example, FIG. 8 illustrates one preferred embodiment of a response sensor. In addition to the other components described above, optical controller 800 includes a response light source 801 and a response light detector 803, both coupled to the controller's processor. When the system is activated, source 801 continuously emits light that is detected by sensor 803 after being reflected off of the user's eye 805.

Due to the difference in reflectivity of the user's eye and the user's eyelid (not shown), when the user blinks, sensor 803 picks up the change in reflected light intensity. Thus the user is able to respond to a specific flashing light by merely blinking. If desired, the sensitivity of the response sensor can be set with processor 301, thus allowing the controller to distinguish between normal eye blinks and intended user responses based on the time the eyelid is closed. Preferably baffling is included around either source 801, detector 803 or both to increase sensitivity by lowering the amount of non-reflected light detector 803 receives directly from source 801.

Preferably the embodiment shown in FIG. 8 is designed to minimize the impact of flashing lights 303–305 as well as ambient light on detector 803. In at least one embodiment, optical controller 800 includes an enclosure 807 as well as an eyepiece 809 to limit the amount of ambient light reaching detector 803. Preferably eyepiece 809 is comprised of a flexible material such as an elastomer, thus providing a thorough seal between enclosure 807 and the user. In at least one embodiment, detector 803 includes an optical filter to limit light detected outside of the wavelength range of source 801.

Preferably source 801 and detector 803 operate in a non-visible wavelength band such as infrared (IR), thus minimizing the interference of the output of lights 303–305 with detector 803 while simultaneously limiting the visual distraction to the user.

An advantage of the embodiments shown in FIGS. 4 and 8 is that an observer cannot determine the user's input (e.g., access code or other input) since the user's eye, and hence the blinking of the eye, is hidden from view. To make data entry more secure, especially in light of the inability of many people to blink one eye without at least squinting the second eye, preferably the system uses random light sequences such as those disclosed with reference to FIG. 5. As a consequence of using random light sequences, an observer is unable to correlate eye squints (or blinks) with a specific light.

In an alternate embodiment of the invention, the user enters their response to the flashing lights by activating a switch, such as a simple push-button or toggle switch. The button or switch may or may not be in sight of casual observers (i.e., nonusers). At least in one embodiment of the invention, the button or switch is mounted within the eyepiece and is activated by lightly applying pressure to the eyepiece. Depending upon the pressure required to activate the switch, an eyepiece mounted switch can be used in a covert fashion, thus preventing casual observation.

Assuming that an observer is unable to view the flashing lights, for example due to the use of an eyepiece such as that shown in FIGS. 4 and 8 or through the use of other obscuring means, the use of a physical switch does not compromise the response security of the optical controller. As in the prior embodiment, the use of a random sequence of lights adds further security since the random lights prevent an observer from determining the user's response based on the timing of the user's input and a known light sequence.

An advantage of using a mechanical mechanism such as push-button or toggle switch is that such a mechanism is generally easier to implement, thus leading to system simplicity and associated cost savings. Additionally, a mechanical switch provides the user with direct feedback to their response since the user can feel that they have pushed a button, toggled a switch, etc.

In an alternate embodiment of the invention, the flashing lights (i.e., lights 303–305) are in clear view of even a casual observer, however the response entering means (e.g., push-button or toggle switch) is hidden from view. As a result of hiding the response mechanism from sight, the controller's response security is maintained.

Preferably controller 300 includes an input means 317, for example imbedded within the processor or the controller's operating software, which determines when to initiate access code verification or accept other forms of input. Without such means controller 300 may inaccurately ascertain input, for example, incorrectly denying access to a bona fide user. In a preferred embodiment of the invention illustrated in FIG. 9, after system power-on (step 501) controller 300 initiates the predetermined light sequence (step 901). The light sequence continues until the system is either powered-down (step 903) or a user response is received (step 905). Assuming that the optical controller is being used in conjunction with a lock as previously described, after the initial user response is received (step 905), the controller monitors subsequent user responses to determine if the sequence of received responses corresponds to a predetermined access code (step 907). If the received access code is incorrect (step 909), the controller responds according to predetermined instructions as previously discussed (e.g., system power-down, monitoring for retries, notifying the user of an incorrect code, etc.). If the received access code is correct, the controller allows access (step 911).

Figure 9:
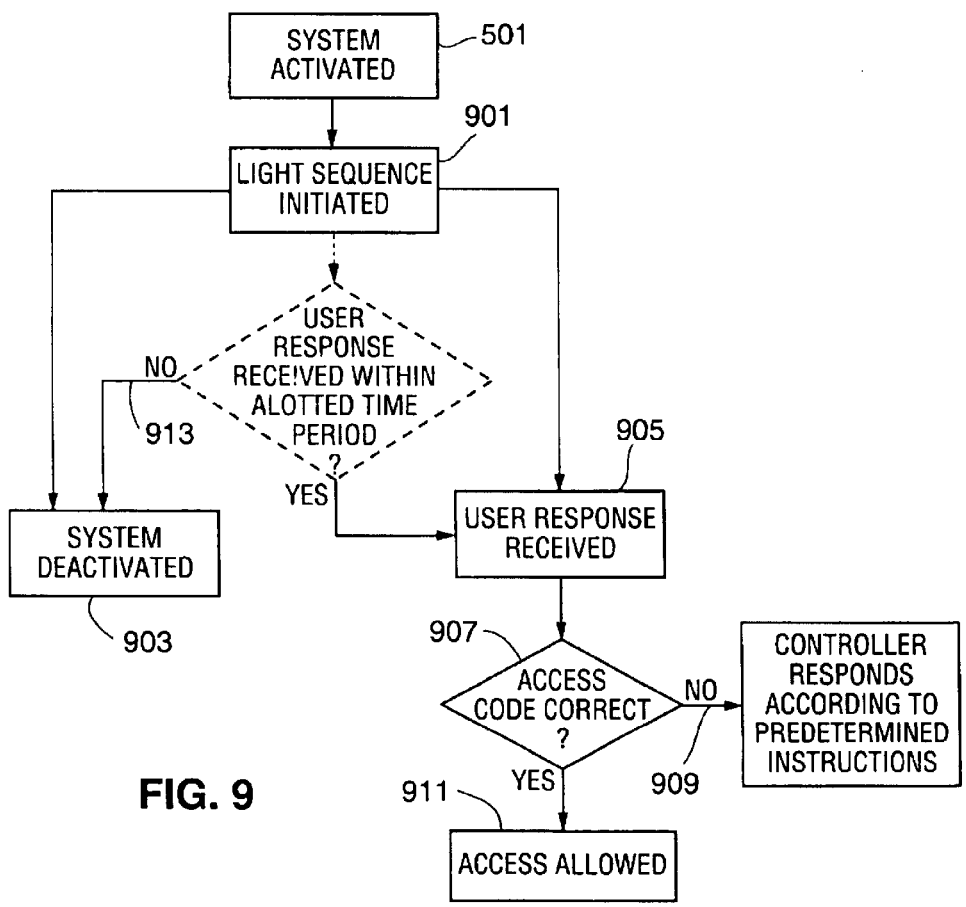
FIG. 9 illustrates the methodology associated with validating user input when the controller is used with a verifiable access code.

In at least one embodiment of the invention, after the light sequence is initiated (step 901) the controller monitors the time to respond (shown in phantom in FIG. 9). If a response is not received within a predetermined time period (step 913) the system is automatically deactivated.

Figure 10:
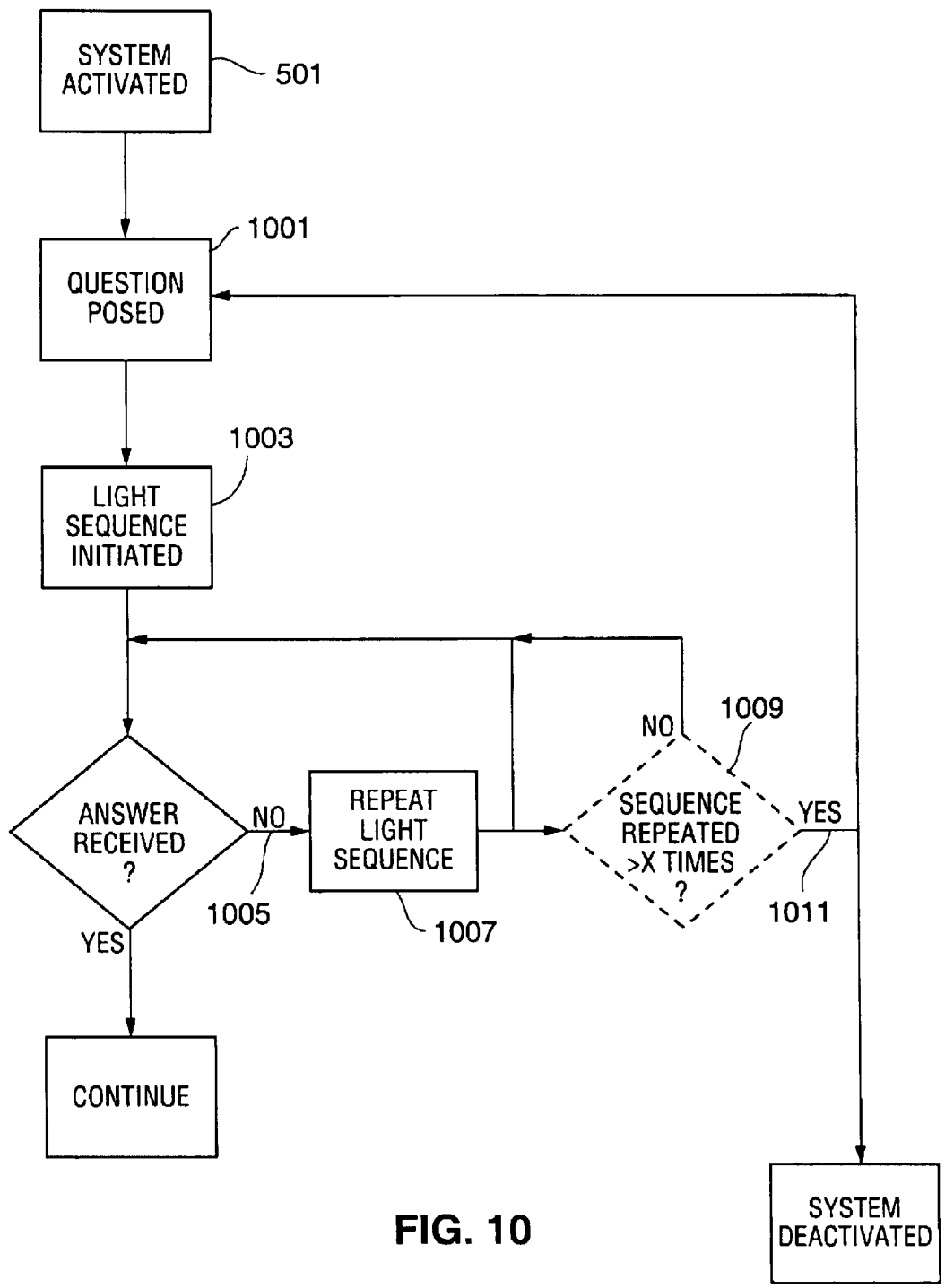
FIG. 10 illustrates the methodology associated with validating user input when the controller is used with a data input interface.

It will be appreciated that alternate applications of the invention can also use the input initiation aspects described above. FIG. 10 illustrates this aspect of a preferred embodiment of the invention for applications in which the controller is used as a testing apparatus interface. In this embodiment, once the system is activated (step 501) and a question is posed (step 1001), the controller initiates the light sequence (step 1003). Preferably if no answer is received (step 1005) after the light sequence is completed (e.g., all three lights are sequentially flashed), the light sequence repeats (step 1007). Thus the user is given time to consider the question asked rather than being forced to respond immediately. This capability is particularly important if the answer choices are more complex than simply "yes", "no" and "unsure". In at least one embodiment, the system monitors the number of times the light sequence is repeated (step 1009—shown in phantom) and after a set number of times (step 1011), follows a preset response (e.g., system deactivation or reposing the question).

As will be understood by those familiar with the art, the present invention may be embodied in other specific forms without departing from the spirit or essential characteristics thereof. For example, the red, green and yellow LEDs described with reference to the preferred embodiments can be replaced by different colors, more or less than three lights, light sources other than LEDs, patterned lights, labeled lights, etc. Accordingly, the disclosures and descriptions herein are intended to be illustrative, but not limiting, of the scope of the invention which is set forth in the following claims.

What is claimed is:

1. An optical controller comprising:
   a plurality of lights, wherein each of said plurality of lights transmits a different color;
   a processor coupled to said plurality of lights, wherein said processor sequentially pulses each light of said plurality of lights in a predetermined light sequence;
   a user response sensor coupled to said processor, said user response sensor having a first state of operation and a second state of operation;
   a memory coupled to said processor, wherein for each light of said plurality of lights pulsed by said processor, said processor registers said state of operation of said user response sensor in said memory as a user response; and
   a comparator circuit coupled to said processor, wherein for each light of said plurality of lights pulsed by said processor, said comparator circuit compares said user response to a predefined response, wherein said comparator circuit outputs a first signal if said user response does not match said predefined response for each light of said plurality of lights, and wherein said comparator circuit outputs a second signal if a predefined plurality of user responses match a predefined response sequence.

2. The optical controller of claim 1, wherein said plurality of lights is comprised of a plurality of LEDs, each of said plurality of LEDs emitting light at a different wavelength.

3. The optical controller of claim 1, wherein at least one of said plurality of lights is further comprised of an optical filter.

4. The optical controller of claim 1, wherein said predetermined light sequence is a random light sequence.

5. The optical controller of claim 1, wherein said predetermined light sequence is a non-random light sequence.

6. The optical controller of claim 1, said user response sensor further comprising:
   a light source directing a beam of light at a user's eye; and
   a detector for receiving reflected light from said user's eye, wherein said detector outputs a first detector output signal when an amplitude associated with said reflected light is less than a first predetermined amplitude, and wherein said detector outputs a second detector output signal when said amplitude associated with said reflected light is greater than a second predetermined amplitude, wherein said first detector output signal corresponds to said first state of operation of said user response sensor, and wherein said second detector output signal corresponds to said second state of operation of said user response sensor.

7. The optical controller of claim 6, wherein said first predetermined amplitude is equivalent to said second predetermined amplitude.

8. The optical controller of claim 6, wherein said light source is an infrared light source.

9. The optical controller of claim 1, further comprising a controller power switch.

10. The optical controller of claim 9, wherein said controller power switch is vibration activated.

11. The optical controller of claim 1, further comprising an electronic locking mechanism having a locked position and an unlocked position, wherein said electronic lock is maintained in said locked position when said comparator circuit outputs said first signal, and wherein said electronic lock is maintained in said unlocked position when said comparator circuit outputs said second signal.

12. An optical controller comprising:
    a housing;
    an eyepiece coupled to said housing, wherein an interior portion of said housing is viewable through said eyepiece;
    a plurality of lights located within said interior portion of said housing, wherein each of said plurality of lights transmits a different color;
    a processor coupled to said plurality of lights, wherein said processor sequentially pulses each light of said plurality of lights in a predetermined light sequence;
    a user response sensor coupled to said processor, said user response sensor having a first state of operation and a second state of operation;
    a memory coupled to said processor, wherein for each light of said plurality of lights pulsed by said processor, said processor registers said state of operation of said user response sensor in said memory as a user response; and
    a comparator circuit coupled to said processor, wherein for each light of said plurality of lights pulsed by said processor, said comparator circuit compares said user response to a predefined response, wherein said comparator circuit outputs a first signal if said user response does not match said predefined response for each light of said plurality of lights, and wherein said comparator circuit outputs a second signal if a predefined plurality of user responses match a predefined response sequence.

13. The optical controller of claim 12, wherein said plurality of lights is comprised of a plurality of LEDs, each of said plurality of LEDs emitting light at a different wavelength.

14. The optical controller of claim 12, wherein at least one of said plurality of lights is further comprised of an optical filter.

15. The optical controller of claim 12, wherein said predetermined light sequence is a random light sequence.

16. The optical controller of claim 12, wherein said predetermined light sequence is a non-random light sequence.

17. The optical controller of claim 12, said user response sensor further comprising:
a light source mounted within said interior portion of said housing, said light source directing a beam of light at an opening of said eyepiece; and
a detector mounted within said interior portion of said housing, said detector receiving reflected light from a user's eye located at said opening of said eyepiece, wherein said detector outputs a first detector output signal when an amplitude associated with said reflected light is less than a first predetermined amplitude, and wherein said detector outputs a second detector output signal when said amplitude associated with said reflected light is greater than a second predetermined amplitude, wherein said first detector output signal corresponds to said first state of operation of said user response sensor, and wherein said second detector output signal corresponds to said second state of operation of said user response sensor.

18. The optical controller of claim 17, wherein said first predetermined amplitude is equivalent to said second predetermined amplitude.

19. The optical controller of claim 17, wherein said light source is an infrared light source.

20. The optical controller of claim 12, further comprising a controller power switch mounted to said eyepiece.

21. The optical controller of claim 20, wherein said controller power switch is a pressure sensitive switch.

22. The optical controller of claim 12, said user response sensor further comprising a pressure sensitive switch mounted on an exterior surface of said housing.

23. The optical controller of claim 12, further comprising an electronic locking mechanism having a locked position and an unlocked position, wherein said electronic lock is maintained in said locked position when said comparator circuit outputs said first signal, and wherein said electronic lock is maintained in said unlocked position when said comparator circuit outputs said second signal.

24. An optical controller comprising:
a housing;
an eyepiece coupled to said housing, wherein an interior portion of said housing is viewable through said eyepiece;
a plurality of lights located within said interior portion of said housing, wherein each of said plurality of lights emits a different color;
a processor coupled to said plurality of lights, wherein said processor sequentially pulses each light of said plurality of lights in a predetermined light sequence;
a light source mounted within said interior portion of said housing, said light source directing a beam of light at an opening of said eyepiece;
a detector mounted within said interior portion of said housing, said detector receiving reflected light from a user's eye located at said opening of said eyepiece, wherein said detector outputs a first detector output signal when an amplitude associated with said reflected light is less than a first predetermined amplitude and a second detector output signal when said amplitude associated with said reflected light is greater than a second predetermined amplitude;
a memory coupled to said processor, wherein for each light of said plurality of lights pulsed by said processor, said processor registers said first detector output signal and said second detector output signal in said memory as a user response;
a comparator circuit coupled to said processor, wherein for each light of said plurality of lights pulsed by said processor, said comparator circuit compares said user response to a predefined response, wherein said comparator circuit outputs a first signal if said user response does not match said predefined response for each light of said plurality of lights, and wherein said comparator circuit outputs a second signal if a predefined plurality of user responses match a predefined response sequence; and
an electronic locking mechanism coupled to said optical controller, said electronic locking mechanism having a locked position and an unlocked position, wherein said electronic lock is maintained in said locked position when said comparator circuit outputs said first signal, and wherein said electronic lock is maintained in said unlocked position when said comparator circuit outputs said second signal.

25. An optical controller comprising:
a plurality of lights, wherein said plurality of lights are individually distinguishable;
a processor coupled to said plurality of lights, wherein said processor sequentially pulses each light of said plurality of lights in a predetermined light sequence;
a user response sensor coupled to said processor, said user response sensor having a first state of operation and a second state of operation;
a memory coupled to said processor, wherein for each light of said plurality of lights pulsed by said processor, said processor registers said state of operation of said user response sensor in said memory as a user response;
a comparator circuit coupled to said processor, wherein for each light of said plurality of lights pulsed by said processor, said comparator circuit compares said user response to a predefined response, wherein said comparator circuit outputs a first signal if said user response does not match said predefined response for each light of said plurality of lights, and wherein said comparator circuit outputs a second signal if a predefined plurality of user responses match a predefined response sequence; and
an electronic locking mechanism having a locked position and an unlocked position, wherein said electronic lock is maintained in said locked position when said comparator circuit outputs said first signal, and wherein said electronic lock is maintained in said unlocked position when said comparator circuit outputs said second signal.

26. The optical controller of claim 25, wherein said plurality of lights are distinguishable on the basis of location within a predetermined light pattern.

27. The optical controller of claim 25, wherein said plurality of lights are distinguishable on the basis of a plurality of labels corresponding to said plurality of lights.

28. A method of generating control signals, the method comprising the steps of:
sequentially pulsing each light of a plurality of lights following a predetermined sequence, wherein each light of said plurality of lights emits a different color;
registering a user response for each light of said plurality of lights;
comparing said user response to a predefined response;
outputting a first control signal if said user response does not match said predefined response; and
outputting a second control signal if a plurality of user responses for a predefined portion of said plurality of lights matches a predefined response sequence.

29. The method of claim 28, wherein said predetermined sequence is a random sequence.

30. The method of claim 28, wherein said predetermined sequence is a non-random sequence.

31. The method of claim 28, wherein said predefined response sequence is an access code.

32. A method of generating control signals, the method comprising the steps of:

sequentially pulsing each light of a plurality of lights following a predetermined sequence, wherein each light of said plurality of lights emits a different color;

monitoring at least one eye of a user;

registering a first user response for each light of said plurality of lights wherein said monitored eye does not blink;

registering a second user response for each light of said plurality of lights wherein said monitored eye blinks;

comparing said first and second user responses to a predefined response sequence;

outputting a first control signal if said first and second user responses do not match said predefined response sequence; and outputting a second control signal if said first and second user responses do match said predefined response sequence.

33. The method of claim 32, wherein said predetermined sequence is a random sequence.

34. The method of claim 32, wherein said predetermined sequence is a non-random sequence.

35. The method of claim 32, wherein said predefined response sequence is an access code.

* * * * *